Feb. 13, 1934.     A. R. GABRIEL     1,946,683
EDUCATIONAL METHOD
Filed June 8, 1933
Fig:1.
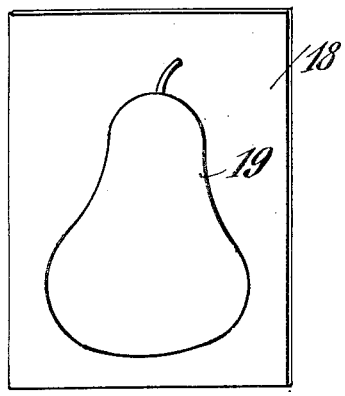
Fig:2.
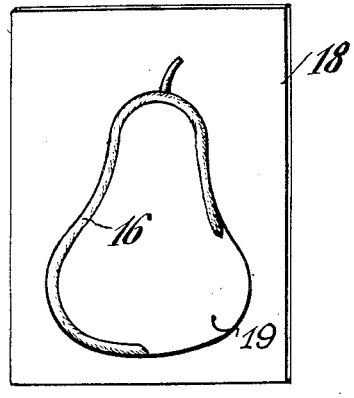
Fig:3.
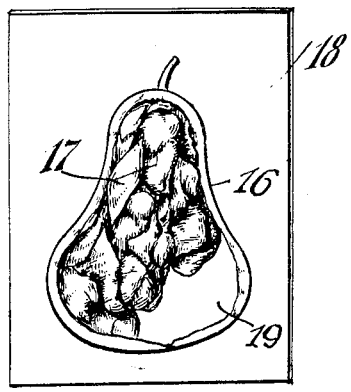
Fig:4.
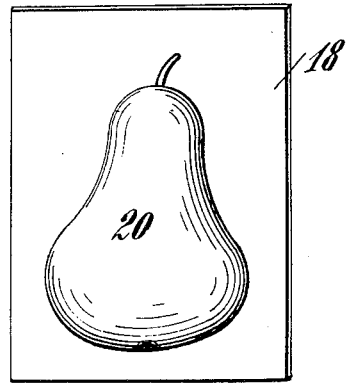
INVENTOR
Arthur R. Gabriel
BY
ATTORNEY.

Patented Feb. 13, 1934

1,946,683

UNITED STATES PATENT OFFICE 1,946,683

EDUCATIONAL METHOD

Arthur R. Gabriel, New York, N. Y.

Application June 8, 1933. Serial No. 674,843

1 Claim. (Cl. 35—12)

This invention relates to an educational method, and more particularly it has for its object to provide a method by which beginners may be taught to build up figures from an outline.

To carry out this object, the invention contemplates the use of a skeleton card upon which the object to be constructed is outlined, and upon which card the sculpture material is fashioned, the material being first formed before application in long threads of small diameter which readily lend themselves to manipulation and to their intended use as a building-up material. The use of my invention enables many beautiful products to be shaped, especially by beginners in the art of sculpture.

The invention will be more fully described hereinafter and finally pointed out in the appended claim.

In the accompanying drawing:—

Figure 1 is a plan view of one of the skeleton cards;

Fig. 2 is a plan view of the same, having the first addition of molding material thereto;

Fig. 3 is a plan view of the same showing further progress in sculpturing;

Fig. 4 is a plan view of the finished product; and

Fig. 5 is a perspective view of the material when formed and ready for use.

In the drawing similar reference characters designate corresponding parts throughout the several views.

The student selects a suitable skeleton card 18, which is preferably made of cardboard, provided with a black colored glazed surface. Upon this surface, there is arranged a white outline 19 of any object, as for instance, of a pear, or other fruit, or of an animal, or of any other desirable object. A plurality of cards would each have a different outline drawing. After such a card has been selected, the student takes a certain amount of molding material which has previously been formed by hand or machine into strand form and places it along the outline, just within the same, as shown in Fig. 2. Then the student adds further quantities 17 of the same in the space within the outline 19 formed by the molding material strip 16, as shown in Fig. 3, until the entire space has been covered, at the same time pressing down the material so as to join the various strips one to the other and form a mass of the same. Then further material is added, depending upon the shape of the object desired to be formed; and when sufficient material has been added the exposed surface is smoothed off to make it resemble as much as possible the article sought to be depicted, as shown in Figure 4.

The difficulty usually encountered by a student is to form his basic shape. This is provided by the skeleton card, and after this aid has been used by the student several times the student is then able to form the outline shape by means of the strands of molding material, without the aid of the outline on the card, and having accurately formed this outline, he can then build inwardly as described and build outwardly as described, until the desired article has been completed. Variously colored clays can be used, and beautiful objects can then be produced, and particularly by those not familiar with all of the ramifications of the art of sculpture.

From the above description considered in connection with the accompanying drawing, the nature of my present invention and its several advantages in practical use will be clearly and fully understood. I accordingly reserve the privilege of resorting to such changes as may fairly fall within the scope of the subjoined claim.

I claim:—

A method for the aid of sculpturing with a plastic material which consists in shaping the plastic material into long thin strands, and laying said strands upon a backing bearing an outline of an article to be simulated lengthwise of the outline and in conformity with said outline to provide the outer margin of the article to be built up.

ARTHUR R. GABRIEL.